US009789957B2

(12) United States Patent
Cox et al.

(10) Patent No.: US 9,789,957 B2
(45) Date of Patent: Oct. 17, 2017

(54) LOAD TRANSFER IN A POWERED AIRCRAFT DRIVE WHEEL

(71) Applicants: Isaiah W. Cox, London (GB); Scott Perkins, Kent, WA (US)

(72) Inventors: Isaiah W. Cox, London (GB); Scott Perkins, Kent, WA (US)

(73) Assignee: Borealis Technical Limited, Gibraltar (GI)

(*) Notice: Subject to any disclaimer, the term of this patent is extended or adjusted under 35 U.S.C. 154(b) by 112 days.

(21) Appl. No.: 14/449,138

(22) Filed: Jul. 31, 2014

(65) Prior Publication Data
US 2015/0151835 A1 Jun. 4, 2015

(51) Int. Cl.
B64C 25/50 (2006.01)
B64C 25/40 (2006.01)

(52) U.S. Cl.
CPC ........... B64C 25/405 (2013.01); *Y02T 50/823* (2013.01); *Y10T 29/49716* (2015.01)

(58) Field of Classification Search
CPC .................................................. B64C 25/405
See application file for complete search history.

(56) References Cited

U.S. PATENT DOCUMENTS 3,211,400 A * 10/1965 Booth ..................... B64C 25/50
244/50
3,977,631 A * 8/1976 Jenny ................... B64C 25/405
188/71.5
6,657,334 B1 12/2003 Edelson
6,838,791 B2 1/2005 Edelson
7,116,019 B2 10/2006 Edelson
7,445,178 B2 11/2008 McCoskey et al.
7,469,858 B2 12/2008 Edelson
7,891,609 B2 2/2011 Cox
7,975,960 B2 7/2011 Cox
8,109,463 B2 2/2012 Cox
(Continued)

FOREIGN PATENT DOCUMENTS

GB 2457144 A 8/2009

OTHER PUBLICATIONS

Boeschoten et al, Analysis of the landing gear Boeing 777-200, University of Applied Sciences Amsterdam Aviation Studies, Oct. 15, 2009.

*Primary Examiner* — Philip J Bonzell

(57) ABSTRACT

An efficient system and method are provided wherein aircraft may be retrofitted with non-engine drive means controllable to power landing gear wheels to move the aircraft autonomously during ground movement without engines or tow vehicles so that existing landing gear structures are employed to achieve force distribution and load transfer. Non-engine drive means capable of powering a landing gear wheel to move the aircraft during taxi are integrated into existing landing gear designs so that excess drive forces are transferred and distributed through previously evaluated and certificated landing gear structures, including tow fittings, determined to be capable of handling such forces, which eliminates changes to the landing gear and facilitates retrofit and certification. Engines-off taxi technology can be rapidly designed and developed to be retrofitted on existing aircraft nose and/or main landing gear and then efficiently certificated.

10 Claims, 2 Drawing Sheets

(56) References Cited

U.S. PATENT DOCUMENTS

2006/0065779 A1* 3/2006 McCoskey ................ B64F 1/32
                                                    244/100 R
2006/0273686 A1   12/2006 Edelson et al.
2009/0114765 A1*  5/2009 Cox ........................ B64C 25/40
                                                    244/50
2011/0297786 A1* 12/2011 Sweet ................... B64C 25/405
                                                    244/103 R
2012/0001018 A1*  1/2012 Gilleran ............... B64C 25/405
                                                    244/50

* cited by examiner

LOAD TRANSFER IN A POWERED AIRCRAFT DRIVE WHEEL

PRIORITY CLAIM

This application claims priority from International Patent Application No. PCT/US2013/, filed 4 Dec. 2013, now withdrawn, the disclosure of which is fully incorporated herein by reference.

TECHNICAL FIELD

The present invention relates generally to the distribution of loads produced by operation of aircraft landing gear and specifically to a system and method for distributing loads and transferring forces in a nose landing gear in an aircraft equipped with a drive wheel powered by a non-engine drive means that moves the aircraft autonomously during ground travel.

BACKGROUND OF THE INVENTION

Aircraft landing gear are subjected to various loads and forces during operation of an aircraft. In addition to the obvious loads associated with landing any aircraft, landing gear are subjected to other forces during ground movement or taxi as the aircraft moves between landing and takeoff. Nose landing gear, which are the most common attachment location for the tugs or tow vehicles used to push an aircraft back from a gate upon departure or to move an aircraft without engine use, are also used to steer an aircraft during taxi and are, therefore, subjected to forces and loads associated with the movement of an aircraft by an external vehicle. In a commercial-sized aircraft weighing in excess of 100,000 kilograms (kg) or 50,000 pounds (lb), these loads and forces can be considerable. Consequently, aircraft landing gear structures, particularly nose landing gear structures used to steer aircraft and attach tow vehicles, must be designed to withstand the range of loads and forces likely to be encountered when an aircraft is moved on a ground surface.

Aircraft landing gear are specifically designed to endure a range of forces encountered during all phases of aircraft operation affecting the landing gear. The arrangement of structural components and the materials from which the components are made are selected to avoid adding unnecessary weight while enhancing operating safety in view of loads likely to be encountered during landing, taxi, and takeoff. The forces on landing gear structures will be different at different times. For example, when an aircraft turns during taxi, upward forces act on landing gear structures, and when the aircraft is traveling in a straight line, lateral forces act on landing gear structures. Aircraft landing gears are designed with specific structures, for example torque links and the like, to absorb such forces and prevent damage to the landing gear.

Once an aircraft has touched down, loads and forces an aircraft will encounter are associated with taxi movements of the aircraft on the ground between its touchdown location and its arrival location and then between its departure location and takeoff. At the present time, moving an aircraft on the ground requires operation of at least one of the aircraft's main engines to enable the aircraft to taxi from the touchdown location to an arrival gate or other parking location. Upon departure of an aircraft from the gate or parking location, the aircraft is attached to a tug or tow vehicle, generally with a tow bar, but at some airports with a towbarless tug, and pushed or otherwise moved in reverse away from a gate or other parking location to a location where the aircraft can safely activate at least one of its main engines and move in a forward direction to the takeoff location. Other aircraft ground movement, such as, for example, the movement of an aircraft to a hangar for maintenance or repair, is typically accomplished by attaching the aircraft through a tow bar to a tug or tow vehicle that pulls the aircraft on the ground, but could also be done by operating the aircraft's engines.

As indicated, tugs and tow vehicles are most often attached to an aircraft's nose landing gear. Tug attachment occurs at specifically designed tow fittings formed integrally with or securely attached to a suitable landing gear structural element. Less frequently, a tug or tow vehicle is attached to an aircraft's main landing gear. Whether an aircraft's nose landing gear or main landing gear is the site of tug attachment, tow fittings must be designed to withstand and absorb towing loads on the aircraft's landing gear, since the tow load is transmitted through the tow fittings.

Because an aircraft's nose landing gear, rather than the main landing gear, is the principal site of tug attachment and is most often subjected to towing loads, nose landing gear structures must be designed and tested to withstand these towing loads. Tow fittings are typically placed in locations on nose landing gear where tug attachment and towing can be accomplished most effectively. Most tugs require attachment of a tow bar to these tow fittings to tow an aircraft. Towing loads are measured, tested, and analysed through the tow fittings normally found on an aircraft's nose landing gear. Certification of tow fittings and other load-absorbing or force-transferring landing gear structures by the Federal Aviation Administration (FAA) and corresponding international regulatory authorities indicates that the design of these structures conforms to required standards and can withstand loads produced during landing gear operation. Relocation of the tow fittings, driving an aircraft differently on the ground, or towing an aircraft in a different way, such as, for example, by a towbarless tug that lifts an aircraft's nose landing gear off the ground for towing, requires reassessment of the forces and loads applied to landing gear and landing gear structure under these changed conditions. Such forces and loads could differ significantly from those to which landing gear structures were subjected prior to modification. Landing gear design and analysis to address the changed torque loads also becomes more challenging. Simply retrofitting aircraft landing gear with different torque or force connection points without a potentially lengthy certification process before the FAA or corresponding international aviation authorities is not a likely possibility.

The use of a drive means, such as a motor structure, integrally mounted with a wheel to rotate the wheel of an aircraft landing gear and move the aircraft has been proposed. The use of such a structure should move an aircraft independently and efficiently on the ground without reliance on the aircraft's main engines. U.S. Pat. No. 7,445,178 to McCoskey et al, for example, describes an aircraft ground movement system with electric nose wheel motors that work in concert with a surface guidance system intended to move a taxiing aircraft. This system requires ground based and other components external to the aircraft for its operation, however. U.S. Pat. No. 7,469,858 to Edelson; U.S. Pat. No. 7,891,609 to Cox; U.S. Pat. No. 7,975,960 to Cox; U.S. Pat. No. 8,109,463 to Cox et al; and British Patent No. 2457144, owned in common with the present invention, describe aircraft drive systems that use electric drive motors to power aircraft landing gear wheels and move an aircraft on the ground without reliance on aircraft main engines or external tow vehicles. While the drive means described in these patents can effectively move an aircraft without towing or aircraft main engine operation during ground operations, transmitting drive forces produced by the drive means through existing landing gear components is not suggested. None of the foregoing art, moreover, recognizes the significant improvement and simplification in landing gear design and load analysis possible with the present invention.

A need exists for a system and method for efficiently equipping an aircraft landing gear with non-engine drive means controllable to power landing gear wheels to move an aircraft autonomously on the ground without attachment to tow vehicles or reliance on aircraft engines that uses existing landing gear structures to distribute loads and forces produced during aircraft ground movement.

SUMMARY OF THE INVENTION

It is a primary objective of the present invention, therefore, to provide a system and method for equipping an aircraft landing gear with non-engine drive means controllable to power landing gear wheels to move an aircraft autonomously on the ground without attachment to tow vehicles or reliance on aircraft engines that uses existing landing gear structures to distribute loads and forces produced during aircraft ground movement.

It is another object of the present invention to provide an aircraft nose landing gear with at least one wheel that is equipped with a non-engine drive means controllable to power the wheel to drive the aircraft autonomously on the ground and is designed to distribute driving forces in excess of the driving force required to move the aircraft on the ground through a force-absorbing structure on the nose landing gear.

It is another object of the present invention to provide a system for transferring forces in excess of those required to drive an aircraft wheel during engines-off taxi to existing structure on a nose landing gear already determined to be capable of absorbing at least the amount of force likely to be transferred.

It is an additional object of the present invention to provide a load transfer system for an aircraft nose landing gear non-engine drive means controllable to power at least one nose or main landing gear wheel and designed to drive the aircraft autonomously on the ground that minimizes the production of additional loads on the nose landing gear.

It is a further object of the present invention to provide a load transfer system for an aircraft nose landing gear with a pair of drive wheels, each equipped with non-engine drive means to power the wheel and drive the aircraft autonomously during taxi, that translates forces generated during taxi through existing landing gear structures, including tow fittings or tow bar attachment structures already determined by aircraft certificating regulatory authorities to have the capability to absorb force of a magnitude likely to be transferred to these structures.

It is yet another object of the present invention to provide a method for rapidly designing, developing, and certificating a retrofit engines-off taxi system based on landing gear design.

In accordance with the aforesaid objects, an efficient system and method are provided that employ existing landing gear structure and design to effectively transfer loads and excess driving forces in an aircraft equipped with non-engine drive means controllable to power landing gear wheels when the aircraft is moved autonomously during ground movement without engines or tow vehicles. Non-engine drive means capable of powering a landing gear wheel are integrated into landing gear design so that force is distributed through existing force transferring or force translating landing gear structures determined capable of absorbing force of a magnitude likely to be transferred or translated. Additional loads on the landing gear are avoided, or at least minimized, essentially eliminating changes to the landing gear and facilitating retrofit and certification. Engines-off taxi technology may then be rapidly designed and developed to take advantage of already certificated force absorbing structures when this technology is retrofitted on existing aircraft nose and/or main landing gear.

Other objects and advantages will be apparent from the following description, claims, and drawings.

DESCRIPTION OF THE INVENTION

The benefits of being able to efficiently and safely move an aircraft during ground operations without reliance on the aircraft's main engines or external vehicles have long been recognized. Actually achieving these benefits, however, has proved challenging. Applicant's previously proposed aircraft landing gear wheel non-engine drive means have been demonstrated to effectively power landing gear wheels to move aircraft on the ground and, thus, can enable aircraft operators to achieve the advantages of autonomous engines-off taxi and/or ground movement. The present invention expands the advantages possible when aircraft can be efficiently retrofitted with and driven during ground operations by controllable onboard non-engine drive means independently of the aircraft's main engines and external tow vehicles using an aircraft's existing landing gear towing structures for transferring driving force. These advantages are achieved, in large part, by the design of an aircraft drive wheel drive system with non-engine drive means components arranged and designed to transfer torque effectively through the drive system so that torque and forces in excess of driving forces required to power and drive an aircraft wheel to move the aircraft on the ground are transmitted outside the drive system to landing gear structures already designed to absorb and withstand loading forces, including torque, of a magnitude required. Driving forces produced during aircraft autonomous ground movement push against existing torque absorbing structures and fittings, including tow fittings. As a result, re-certification should not be required. This use of such already certificated landing gear structures simplifies significantly the design and development, as well as the certification, of engines-off taxi technology. Employing non-engine drive means, such as, for example, those described and shown herein, to drive aircraft during ground travel facilitates retrofitting aircraft landing gear with this technology and obtaining the required regulatory certifications.

Figure 1:
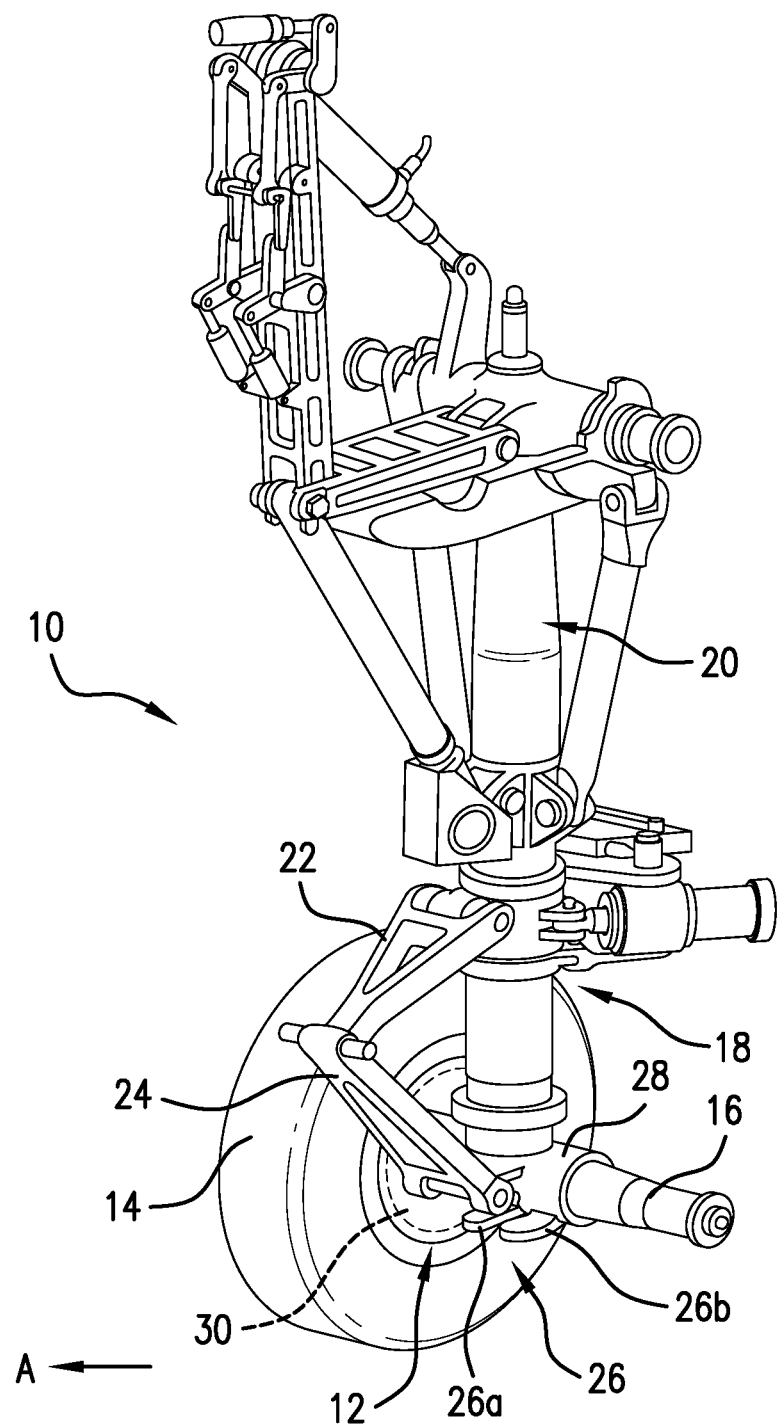
FIG. 1 is a perspective view of one design of an aircraft nose landing gear.

Referring to the drawings, FIG. 1 illustrates a perspective view of one design of an aircraft nose landing gear. This particular nose landing gear, which illustrates only one example of one type of landing gear, currently used on a Boeing 747 aircraft. The present invention may be used with or installed on any aircraft landing gear that includes structure for distributing loads and/or transferring forces. While the present invention is discussed in connection with a preferred use on an aircraft nose landing gear, this system and method may also be effectively used with an aircraft main landing gear. The nose landing gear 10 of FIG. 1 is shown with only one wheel 12 and tire 14 so that other structures may be shown more clearly. The forward end of the aircraft is in the direction of arrow A. The wheel 12 and tire 14 are rotatably mounted on a wheel axle, such as wheel axle 16. A second wheel supporting a tire will be mounted on the wheel axle 16.

The wheel axles are connected to a stationary axle fitting 28 and through steering elements 18 to a landing gear shock strut or piston 20. Various braces, struts, actuators, and other landing gear elements, that are not identified herein, may act to retract and/or extend the landing gear and to maintain the landing gear in place when extended during aircraft ground travel. An upper torsion or torque link 22 may be hingedly connected to a lower torsion or torque link 24. These structures help to absorb loads on the landing gear and can be modified to have a shimmy damper function.

A dual tow fitting assembly 26 may be connected to the stationary axle fitting 28 perpendicular to a longitudinal axis of the landing gear strut 20 to extend forwardly of the landing gear. The dual tow fitting assembly 26, which includes two attachment elements 26a and 26b, may be designed to attach one end of a tow bar (not shown) to the landing gear 10 so that a tug or tow vehicle (not shown) can be attached to an opposite end of the tow bar, enabling the tug to push the aircraft back from a departure location or otherwise move the aircraft on the ground. The dual tow fitting assembly 26 may be designed and constructed so that each of the attachment elements 26a and 26b is able to withstand forces in excess of specific or estimated loads associated with the attachment of a tow bar to the tow fittings and with the attachment of a tow vehicle or tug to the tow bar to move the aircraft in a reverse direction or in a forward direction on the ground.

Figure 2:
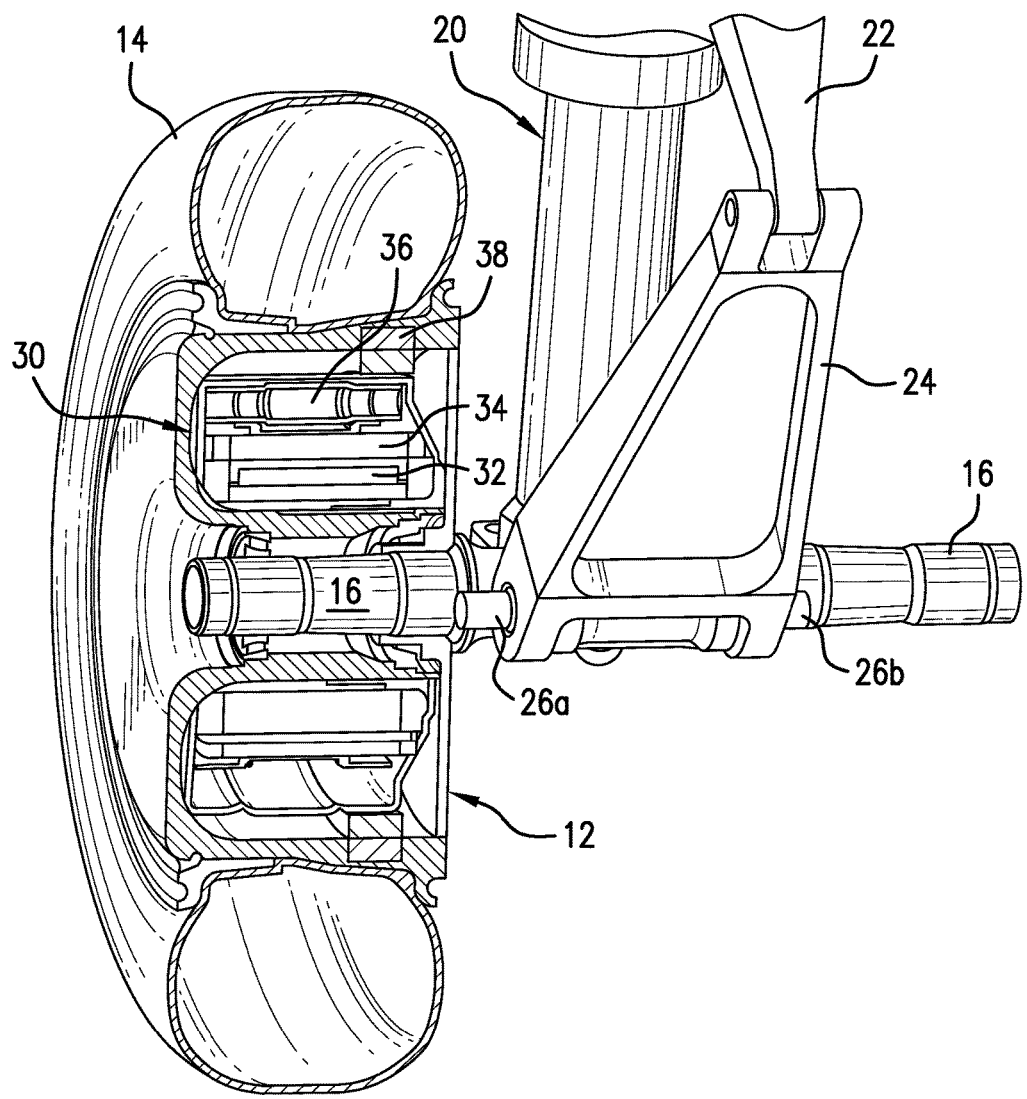
FIG. 2 is a perspective diagram of a portion of a second design of an aircraft nose landing gear equipped with one type of non-engine drive means capable of powering an aircraft landing gear wheel to drive the aircraft autonomously on the ground so that excess drive forces are directed to existing landing gear tow fittings.

FIG. 2 illustrates a portion of a different landing gear design than that shown in FIG. 1. Although the design differs, the same reference numbers have been used to designate similar or equivalent landing gear structures. The landing gear shown in FIG. 2 may also include wheel axles 16 connected to a stationary axle fitting, such as fitting 28 (FIG. 1), between the wheel axles 16, which is connected to a piston or strut 20. The piston or strut 20 supports hingedly connected torsion or torque links 22 and 24. As in FIG. 1, the wheel 12 and tire 14 have been omitted from one side of the landing gear drawing to show associated landing gear structures more clearly. The wheel 12 and tire 14 are shown in cross-section in FIG. 2 to illustrate more clearly the mounting of an exemplary non-engine drive means 30 in a preferred location completely within the dimensions of the landing gear wheel 12.

In the landing gear design shown in FIG. 2, the tow fitting assembly has a different design than in the landing gear design shown in FIG. 1. Only a single tow fitting attachment element 26a is fully visible; a second tow fitting attachment element 26b located on an opposite side of the lower torque link 24 from attachment element 26a can be partially seen. The tow fitting assembly 26 of FIG. 1 is located below the lower torsion or torque link 24, while the tow bar attachment elements 26a and 26b of the FIG. 2 tow fitting assembly may be located on the lower torsion or torque link 24. The different locations of these tow fitting assemblies in each landing gear is likely to affect the way each of the different landing gears reacts to forces and loads associated with towing. When the design of a non-engine drive means mounted to drive a wheel in a landing gear directs excess driving forces generated during drive means operation through existing, already certificated, tow fittings, such as tow bar attachment elements 26a and 26b, retrofitting and certificating the drive means on an aircraft landing gear wheel is simplified. A torque take out assembly (not shown) may also be provided to distribute torque generated in excess of that required to power and drive an aircraft landing gear wheel to move the aircraft during taxi.

The drive means 30 shown in FIG. 2 is only one of a number of non-engine drive means designs suitable for equipping an aircraft landing gear wheel for autonomous ground travel without reliance on the main engines or tugs to move the aircraft. The drive means 30, which, as indicated above, is mounted completely within the dimensions of the wheel 12 to rotate about the wheel axle 16. A preferred non-engine drive means may be one of the electric motors described below and may include a stationary element or stator 32 and a rotating element or rotor 34. A drive means actuator 36, which actuates the drive means, is preferably activated by a clutch 38. The drive means actuator 36, which is only partially shown in FIG. 2, may be a gear system, a roller drive system, or any other suitable drive means actuator. A preferred torque transfer configuration and arrangement of components of a preferred drive means 30 is shown in FIG. 2. This arrangement of components is shown and described more fully in commonly owned copending International Application No. PCT/US13/56775, entitled Torque Transmission in an Aircraft Drive Wheel Drive System, filed 27 Aug. 2013, the disclosure of which is incorporated herein. Other functionally equivalent arrangements and configurations capable of effectively transferring torque in excess of that required to drive an aircraft wheel to move an aircraft during taxi are also contemplated to be within the scope of the present invention.

Although only one landing gear wheel is shown in FIGS. 1 and 2, it is contemplated that one or more nose landing gear wheels, one or more main landing gear wheels, or a combination of nose and main landing gear wheels could be equipped with drive wheel drive systems and load transfer systems as described herein. In one possible arrangement, for example, equipping both wheels in a two-wheel nose landing gear with an aircraft drive wheel system as described herein provides the capability not only to effectively move the aircraft on the ground, but also to differentially steer and brake the aircraft by selective activation of the drive means of each wheel, as well as to achieve effective torque transfer through aircraft drive wheels. The non-engine drive means arrangement for each of the landing gears shown allows excess driving force and other loads generated during drive means operation to be effectively transferred to the tow fitting assembly 26 and to the tow bar attachment elements 26a and 26b in each landing gear, or to a structure, for example a torque take out arm, specifically designed for that purpose.

A non-engine drive means 30 preferred for powering an aircraft landing gear according to the present invention may be an electric motor assembly that is capable of operating at the torque and speed required to move an aircraft wheel and, therefore, an aircraft autonomously during ground operations without tow vehicles or operation of the aircraft's main engines. An example of one of a number of suitable types of non-engine drive means useful in an aircraft drive wheel drive system that could be used effectively in the present system is an inside-out electric motor in which the rotor can be internal to or external to the stator, such as that shown and described in U.S. Patent Application Publication No. 2006/0273686, the disclosure of which is incorporated herein by reference. A range of motor designs capable of the high torque operation across a desired speed range optimal for driving an aircraft wheel may also be suitable non-engine drive means in the present load transfer system. A high phase order electric motor of the kind described in, for example, U.S. Pat. Nos. 6,657,334; 6,838,791; 7,116,019; and 7,469,858, the disclosures of the aforementioned patents being incorporated herein by reference, may also be effectively used as a non-engine drive means 30. An example of a particularly suitable drive means 30 is a high phase order induction motor with a top tangential speed of about 15,000 linear feet per minute and a maximum rotor speed of about 7200 rpm, although drive means capable of a wide range of such speeds could be used with the present system and method for transferring loads in a powered aircraft drive wheel. Other non-engine drive means, including hydraulic and/or pneumatic drive means, are also contemplated to be useful as non-engine drive means in the present invention. A wire harness or other convenient wiring arrangement that ultimately connects the components of an electric drive means to the aircraft electrical system and/or a source of electrical power is not shown, but would be included.

The components of the aircraft landing gear drive wheel non-engine drive means 30 are preferably designed to withstand high torque loads, preferably torque loads in excess of a maximum torque load determined to be optimal for a landing gear drive system. In the event that the torque generated by operation of the aircraft landing gear drive wheel or any of the drive means components exceeds this maximum torque, these excess driving forces may be transferred through the system, generally from the outboard side of the wheel to the inboard side of the wheel, to the tow fitting assembly tow bar attachment elements 26a and 26b on a stationary landing gear structure as shown in FIGS. 1 and 2, or to a specific torque take out structure or assembly (not shown). Torque to rotate the aircraft landing gear wheel 12 is produced by a non-engine drive means, such as drive means 30, when power is supplied to the drive means. In the case of an electric drive means, electric current to power the drive means is preferably provided by the aircraft's auxiliary power unit (APU), but could be supplied by another power source.

Rotation of the drive means rotor 32, transmits torque to and causes the aircraft wheel 12 to rotate about the axle 16, moving the aircraft in the direction of rotation. Torque transmission may be affected by the interaction between the drive means actuator 36 and the drive means 30 and by the interaction between the actuator 36 and a clutch assembly 38. The drive means actuator 36 can change the speed of the drive means 30 in response to the torque of the drive means and actuate or de-actuate operation of the drive means accordingly. The clutch assembly 38, which preferably includes an attachment to the aircraft drive wheel 12, can activate or de-activate operation of the drive means actuator 36 in response to wheel torque. The specific locations and functions of these components can be varied, depending on the design of the landing gear.

The present invention further encompasses a method based on landing gear design of specific aircraft for efficiently retrofitting aircraft landing gear with drive means to power landing gear wheels for autonomous ground movement. Development and certification of the drive means may be facilitated by using known landing gear designs, particularly landing gear designs in which the configuration and location of selected structures, such as tow fittings or torque take out structures, have already been analysed and certificated for their capacity to withstand and/or distribute loads of the type and magnitude encountered during aircraft ground movement. In this situation, the loads produced by the drive means are directed through existing landing gear structures that have already been evaluated for their capacity to handle such loads. The aircraft is driven using these existing structures, and forces are transferred from the drive means specifically through tow fittings already determined able to meet or exceed such force transfer loads. Analysis of the loads and certification of the drive means on the landing gear, therefore, does not involve different force considerations and should be easier than if different structures or locations were used to distribute forces generated by powered landing gear wheel drive means and drive means components.

A determination of whether loads produced by a drive wheel non-engine drive means may be effectively transferred to landing gear structures or locations that have not previously been required to absorb forces and/or loads during aircraft ground travel can require a substantial amount of development and analysis. It must be ensured that such loads are optimally distributed and that landing gear structures or locations can withstand the loads proposed. Redesign of the landing gear could even be required. Certification by the FAA or other regulatory agencies in this situation is likely to be a lengthy process. The present invention permits the relatively rapid design, development, and certification to retrofit aircraft landing gear with non-engine drive means able to move an aircraft autonomously, or engines-off taxi technology, based on force absorbing capability already determined for current landing gear designs. This permits drive means forces in excess of those required to drive the aircraft wheel to be taken out through tow bar attachment points that have already been evaluated and determined to be capable of withstanding or distributing these forces. Engines-off taxi technology may then be used to efficiently drive an aircraft independently or autonomously during ground operations or taxi with drive means that eliminate reliance on operation of an aircraft's main engines or tow vehicles to move aircraft on a ground surface.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability where it is desired to ensure effective load transfer when aircraft landing gear wheels are equipped with non-engine drive means controllable to autonomously move the aircraft during ground travel so that excess loads are directed to existing aircraft landing gear structures already evaluated for their capability to withstand such loads. Retrofitting aircraft for engines-off taxi technology can then be accomplished with a minimal amount of development and analysis and relatively rapid certification of the landing gear-mounted engines-off taxi technology.

The invention claimed is:

1. An aircraft landing gear drive wheel drive system configured to distribute and transfer loads and forces in excess of driving forces through aircraft landing gear components while aircraft are driven autonomously without engines or tow vehicles during aircraft ground movement, comprising:
  a. an aircraft nose landing gear comprising at least a landing gear shock strut supporting a pair of tire-supporting wheels rotatably mounted on axles connected to the landing gear, and landing gear force-distributing and force-transferring structures located on said nose landing gear to withstand and absorb upward and lateral loading and driving forces and torque on said nose landing gear during aircraft ground movement, wherein said force-distributing and force-transferring structures comprise at least said landing gear shock strut, a landing gear torsion or torque link, and a landing gear tow fitting assembly; and
  b. a nose landing gear drive wheel drive system mounted within a housing located completely within dimensions of walls of each said wheel comprising a non-engine drive means for driving the aircraft during ground movement without operation of aircraft engines and tow vehicles, a non-engine drive means actuator, and a clutch positioned within said housing in a torque transfer arrangement, wherein said clutch is positioned in direct torque transfer activation with said non-engine drive means actuator and said non-engine drive means actuator is positioned in direct torque transfer actuation with said non-engine drive means, said non-engine drive means is located in direct torque transfer with said wheels, and said drive wheel drive system is located in direct or indirect force transfer relationship said force-distributing and force-transferring structures.

2. The system of claim 1, wherein said force-distributing and force-transferring structures comprise a pair of attachment elements on the landing gear tow fitting assembly, and each said attachment element is mounted on a landing gear axle fitting or on said landing gear torsion or torque link in force transfer connection with said drive wheel drive system.

3. The system of claim 1, wherein said non-engine drive means comprises an electric drive motor, said non-engine drive means actuator comprises a roller traction drive system or a gear system positioned to receive torque from said clutch and to transfer torque to said electric drive motor.

4. The system of claim 1, wherein said non-engine drive means, said non-engine drive means actuator, and said clutch are designed to withstand torque loads in excess of a maximum torque load determined to be optimal for said drive wheel drive system.

5. A method for transferring loads and forces produced on an aircraft landing gear in excess of driving force required to move the aircraft autonomously without engines and tow vehicles as the aircraft is driven during ground movement without redesigning landing gear on an aircraft, comprising:
  a. retrofitting within a housing mounted completely within wheel walls of one or more aircraft landing gear wheels an engines-off taxi system comprising a non-engine drive means for generating torque and driving force to power and drive the one or more aircraft landing gear wheels during taxi, wherein the engines-off taxi system powers and drives the aircraft during taxi by torque transfer when a clutch activates a non-engine drive means actuator that actuates the non-engine drive means to transfer driving torque to the one or more aircraft landing gear wheels during taxi;
  b. retaining existing aircraft landing gear force transfer and distribution structures comprising at least a landing gear shock strut, a landing gear torsion or torque link, and a tow fitting assembly previously determined able to withstand loads and forces comprising at least driving upward and lateral forces and torque acting on the landing gear produced when the aircraft is moved by aircraft engines and tow vehicles during ground movement; and
  b. driving the aircraft with the retrofitted engines-off taxi system during taxi and ground movement, and transferring and distributing loads and forces in excess of the driving torque through the engines-off taxi system from an outboard side to an inboard side of said one or more aircraft landing gear wheels to said existing aircraft landing gear force transfer and distribution structures.

6. The method of claim 5, further comprising retrofitting the engines-off taxi system completely within each nose landing gear wheel on an existing aircraft nose landing gear and is directly or indirectly connecting the engines-off taxi system to transfer loads and forces in excess of the driving torque to the existing aircraft landing gear force transfer and distribution structures with minimal changes to said existing aircraft nose landing gear.

7. The method of claim 5, further comprising when the loads and forces in excess of the driving torque comprise excess torque, directing the excess torque to tow bar attachment structures or tow fittings on the tow fitting assembly.

8. The method of claim 5, further comprising mounting the engines-off taxi system and housing completely within each wheel of an aircraft nose landing gear to be in upward and lateral force and torque transfer contact with nose landing gear force transfer and distribution structures, and transferring the upward and lateral forces and torque in excess of the driving torque from said engines-off taxi system to said nose landing gear force transfer and distribution structures while the aircraft is driven with the engines-off taxi system.

9. The method of claim 8, further comprising directing said excess upward and lateral forces and torque to said nose landing gear force transfer and distribution structures comprising a tow fitting assembly connected to a nose landing gear axle fitting and to a torsion or torque link on said aircraft nose landing gear.

10. A method for transferring loads and forces produced when engines-off electric taxi systems installed in aircraft landing gear wheels are operated to drive aircraft autonomously during ground operations and taxi without reliance on aircraft engines and tow vehicles that avoids redesigning aircraft landing gear, comprising:
  a. providing a controllable engines-off electric taxi system comprising a clutch assembly engageable to activate and transfer torque to a drive assembly in actuating and torque transfer contact with an electric motor, wherein controlling the engines-off electric taxi system engages the clutch assembly to activate and transfer torque to the drive assembly, activation of the drive assembly actuates and transfers torque to the electric drive motor, and the actuated electric drive motor transfers driving torque to an aircraft landing gear wheel and drives the aircraft during ground operations and taxi;
  b. providing an aircraft nose landing gear with a pair of wheels and with force-absorbing structures supported on and attached to the aircraft nose landing gear, comprising at least a landing gear shock strut, a landing gear torsion or torque link, and a tow fitting assembly evaluated and determined able to withstand, transfer, and distribute forces and loads on said force-absorbing structures during aircraft ground operations and taxi;
c. retrofitting the engines-off electric taxi system within a housing mounted completely within dimensions of walls of each wheel in the pair of wheels in the aircraft nose landing gear to transfer driving torque to each wheel when the engines-off electric taxi system is controlled to drive the aircraft during ground operations and taxi;
d. controlling the engines-off electric taxi system in each of the wheels to engage the clutch assembly, activate the drive assembly, actuate the electric drive motor and transfer torque to the electric drive motor and driving torque to each of the wheels to drive the aircraft during ground operations and taxi; and
e. transferring loads and torque in excess of driving torque produced during the aircraft ground operations and taxi from the engines-off electric taxi system to the force-absorbing structures.

* * * * *